(12) United States Patent
Pearce (10) Patent No.: US 9,297,531 B2
(45) Date of Patent: Mar. 29, 2016

(54) GAS TURBINE ENGINE FUEL CONTROL USING GAS MEASUREMENT AT THE AIR INLET

(75) Inventor: Robert Pearce, Lincoln Wickenby (GB)

(73) Assignee: SIEMENS AKTIENGESELLSCHAFT, München (DE)

( * ) Notice: Subject to any disclaimer, the term of this patent is extended or adjusted under 35 U.S.C. 154(b) by 1082 days.

(21) Appl. No.: 13/388,685

(22) PCT Filed: Aug. 13, 2009

(86) PCT No.: PCT/EP2009/060522
§ 371 (c)(1),
(2), (4) Date: Feb. 3, 2012

(87) PCT Pub. No.: WO2011/018115
PCT Pub. Date: Feb. 17, 2011

(65) Prior Publication Data
US 2012/0137692 A1 Jun. 7, 2012

(51) Int. Cl.
| | | |
|---|---|---|
| *F02C 9/28* | (2006.01) | |
| *F02C 9/34* | (2006.01) | |
| *F23N 5/00* | (2006.01) | |
| *F02C 7/22* | (2006.01) | |

(Continued)

(52) U.S. Cl.
CPC ............... *F23N 5/003* (2013.01); *F23R 3/286* (2013.01); *F23R 3/343* (2013.01); *F02C 7/228* (2013.01); *F02C 9/28* (2013.01); *F02C 9/34* (2013.01); *F23N 2041/20* (2013.01); *F23N 2900/05002* (2013.01); *F23N 2900/05003* (2013.01)

(58) Field of Classification Search
CPC .............. F02C 7/228; F02C 9/28; F02C 9/32; F02C 9/34; F02C 9/263; F02C 1/08; F02C 3/34; F05B 2270/106; F05B 2270/1062; F05B 2270/1063
See application file for complete search history.

(56) References Cited

U.S. PATENT DOCUMENTS 5,339,620 A * 8/1994 Ikeda .................. F23R 3/26
60/39.27
5,954,040 A 9/1999 Riedel
(Continued)

FOREIGN PATENT DOCUMENTS

| EP | 1367328 A2 | 12/2003 |
|---|---|---|
| EP | 1548255 A1 | 6/2005 |
| EP | 1607606 A1 | 12/2005 |
| JP | 63311025 A | 12/1988 |
| WO | WO 2004044406 A1 | 5/2004 |

OTHER PUBLICATIONS

M Kong, 2006, Institute of Physics Publishing Journal of Physics: Conference Series 48 (2006).*

(Continued)

*Primary Examiner* — Phutthiwat Wongwian
*Assistant Examiner* — Rene Ford (57) ABSTRACT

A gas turbine engine is provided. The gas turbine engine includes an air inlet, a combustor, an exhaust and first and second measurement devices. A plurality of fuel supply lines is provided to the at least one combustor. The first measurement device measures an amount of a gas in the air inlet. The second measurement device measures an amount of the gas in the exhaust. A control unit varies the fuel supply in the plurality of fuel supply lines so as to control the amount of the gas in the exhaust. The variation is made in dependence upon both the measured amount of the gas in the air inlet and the measured amount of the gas in the exhaust.

13 Claims, 6 Drawing Sheets

(51) Int. Cl.
*F23R 3/28* (2006.01)
*F23R 3/34* (2006.01)
*F02C 7/228* (2006.01)

(56) References Cited

U.S. PATENT DOCUMENTS

| | | | |
|---|---|---|---|
| 2001/0027637 A1* | 10/2001 | Norster et al. | 60/39.03 |
| 2007/0089425 A1 | 4/2007 | Fossum | |
| 2009/0217672 A1* | 9/2009 | Bulat et al. | 60/772 |
| 2012/0022728 A1* | 1/2012 | Hall et al. | 701/19 |

OTHER PUBLICATIONS

Ebert V et al : "Einsatz Der Lasermesstechnik Zur Diagnostik Und Optimierung Von Technischen Verbrennungsprozessen. Ölaser-Based Non Intrusive Measurements of Concentrations and Temperatures in Technical Combustion Devices" Technisches Messen TM, R. Oldenbourg Verlag. Munchen, DE, vol. 63, No. 7/08, Jul. 1, 1996, pp. 268-277, XP000631178, ISSN: 0171-8096, the whole document.; Others; 1996.

* cited by examiner

GAS TURBINE ENGINE FUEL CONTROL USING GAS MEASUREMENT AT THE AIR INLET

CROSS REFERENCE TO RELATED APPLICATIONS

This application is the US National Stage of International Application No. PCT/EP2009/060522, filed Aug. 13, 2009 and claims the benefit thereof.

FIELD OF INVENTION

The present invention relates to a combustion apparatus.

More particularly the present invention relates to a combustion apparatus comprising: an air inlet; at least one combustor; a plurality of fuel supply lines to the combustor(s); an exhaust; a measurement device for measuring the amount of a gas in the exhaust; and a control unit arranged to vary the fuel supply in the plurality of fuel supply lines so as to control the amount of the gas in the exhaust, the variation being made in dependence upon the measured amount of the gas in the exhaust.

BACKGROUND OF INVENTION

Figure 1:
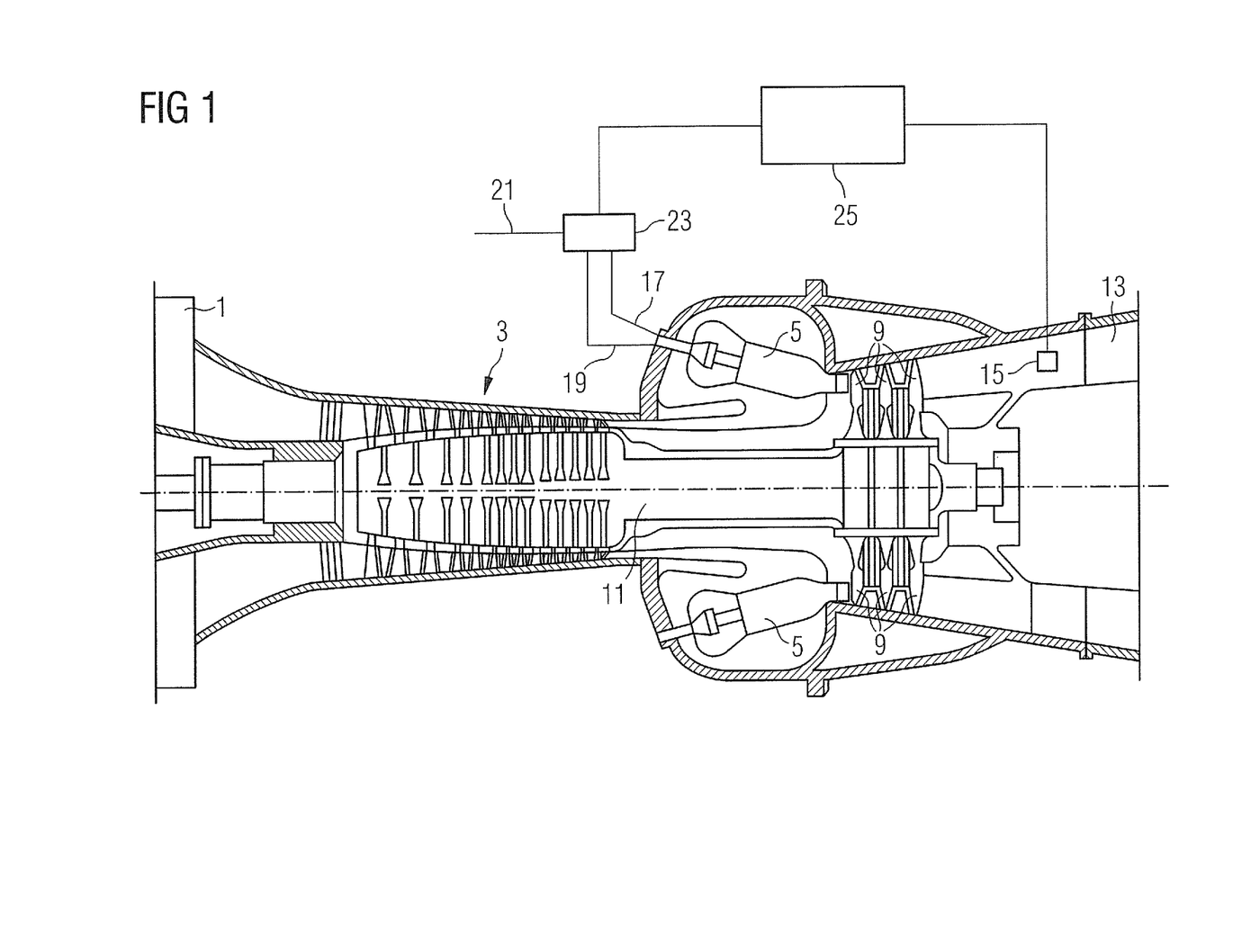
FIG. 1, already referred to, is a longitudinal cross section through a gas turbine engine.

One such combustion apparatus is shown in FIG. 1 of the accompanying drawings and comprises a gas turbine engine, FIG. 1 being a longitudinal cross section through the engine.

The engine comprises an air inlet 1, a compressor stage 3, combustors 5, a series of rotor blades 9, a rotor shaft 11, and an exhaust 13. Air enters air inlet 1, is compressed in compressor stage 3, and mixed with fuel and the mix combusted in combustors 5. Hot gases produced by the combustion drive rotor blades 9 and hence rotor shaft 11. Rotor shaft 11 both (i) provides mechanical torque so as to deliver the work done by the engine, and (ii) drives compressor stage 3 so as to draw further air in through air inlet 1. Following rotor blades 9, the hot gases leave the engine via exhaust 13.

Figure 2:
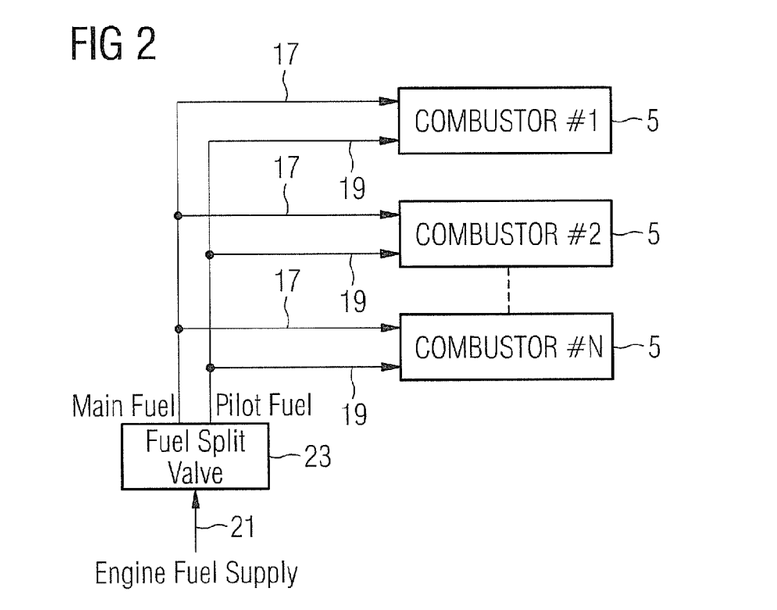
FIG. 2, already referred to, shows the supply of fuel by a fuel split valve of the engine of FIG. 1 to combustors of the engine of FIG. 1.

The engine further comprises an engine fuel supply line 21, a fuel split valve 23, main and pilot fuel supply lines 17, 19 to each combustor 5 (the main and pilot fuel supply lines to only one combustor are shown in FIG. 1), a measurement device 15 located in exhaust 13 for measuring the amount of nitrogen oxides (NOx) in the exhaust, and a control unit 25 for adjusting the setting of fuel split valve 23 based on the measured amount of NOx in the exhaust. Fuel split valve 23 divides the fuel it receives on engine fuel supply line 21 between the main and pilot fuel supply lines 17, 19 to each combustor 5. FIG. 2 of the accompanying drawings shows the supply of fuel by fuel split valve 23 to combustors 5. Control unit 25 adjusts the setting of fuel split valve 23 to control the amount of NOx in the exhaust.

Figure 3:
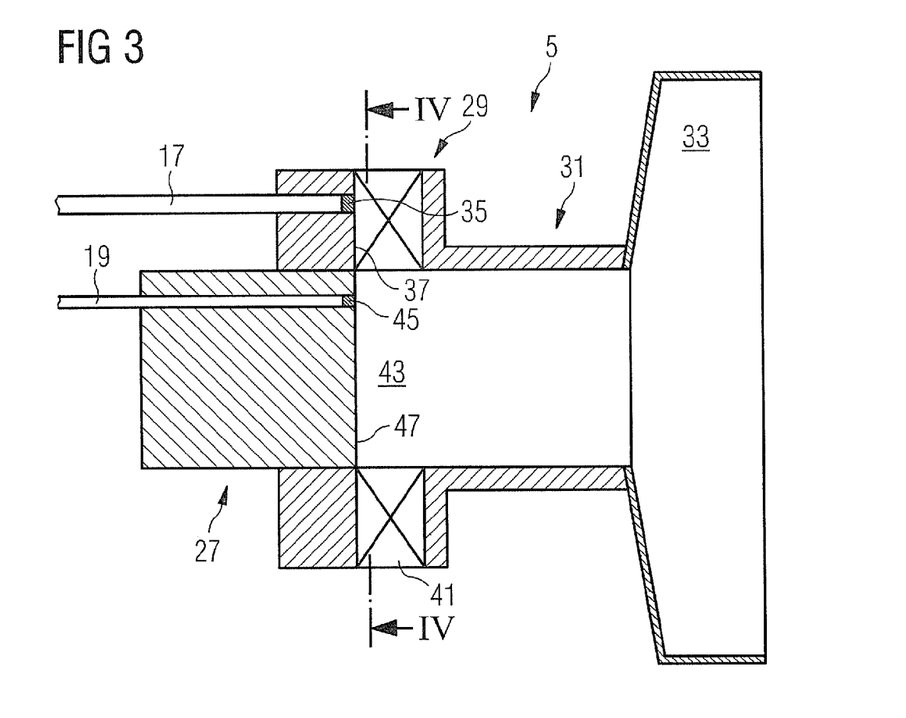
FIG. 3, already referred to, is a longitudinal cross section through a combustor of the engine of FIG. 1.
Figure 4:
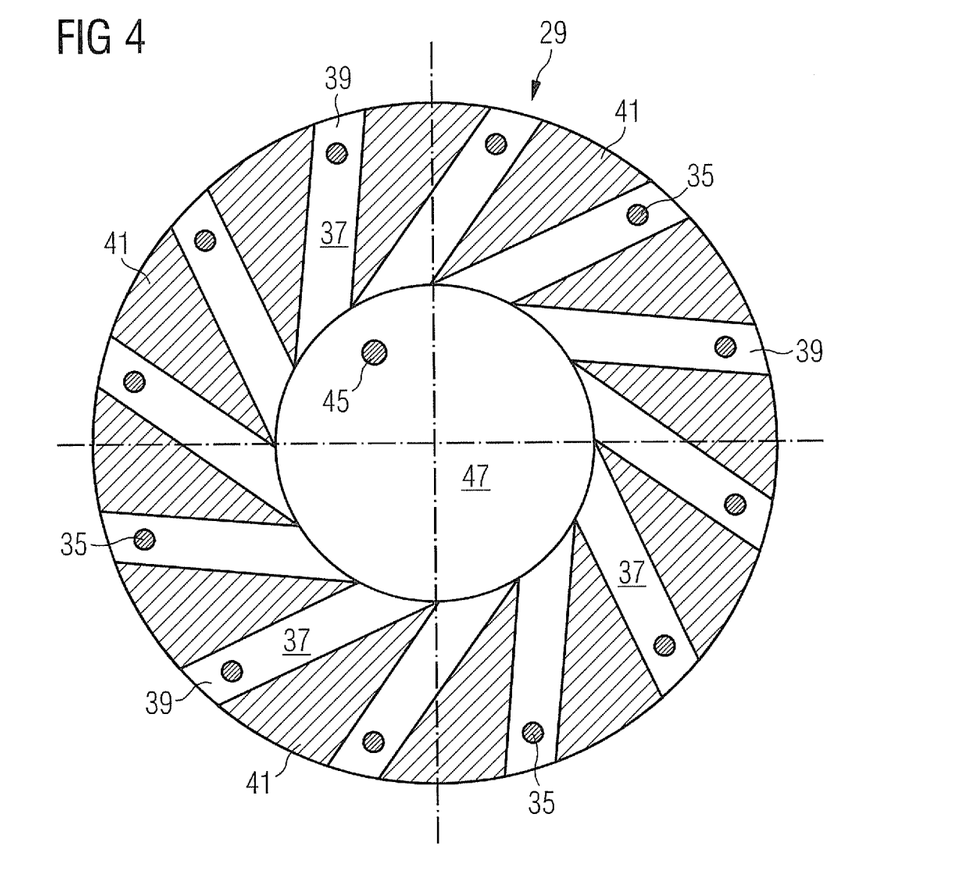
FIG. 4, already referred to, is a cross section on the line IV-IV in FIG. 3.

FIGS. 3 and 4 of the accompanying drawings show a combustor 5 in greater detail, FIG. 3 being a longitudinal cross section through the combustor and FIG. 4 being a cross section on the line IV-IV in FIG. 3.

The combustor 5 comprises a front end part 27, a radial swirler 29, a pre-chamber 31, and a combustion chamber 33. Main fuel received on main fuel supply line 17 passes to main fuel nozzles 35 located in the bases 37 of flow slots 39 defined between adjacent wedge shaped vanes 41 of radial swirler 29. The main fuel enters the flow slots where it mixes with air travelling generally radially inwardly along the flow slots. The mix of main fuel and air travels inwardly along the flow slots to create a swirling mix of main fuel and air in the central region 43 of the radial swirler. Pilot fuel received on pilot fuel supply line 19 passes to pilot fuel nozzle 45 in end face 47 of front end part 27, from where the pilot fuel also enters central region 43. The supply of both (i) the mix of main fuel and air and (ii) the pilot fuel to central region 43 maintains combustion in pre-chamber 31 and combustion chamber 33 of the combustor.

The mix of main fuel and air when it enters central region 43 comprises a pre-mixed, lean burn component of the supply for combustion. The pilot fuel when it enters central region 43 comprises a not pre-mixed, rich burn component of the supply for combustion. The pre-mixed, lean burn component has the advantage that it produces relatively low NOx, but the disadvantage that it produces relatively unstable combustion (a relatively unstable flame). The not pre-mixed, rich burn component has the advantage that it produces relatively stable combustion (a relatively stable flame), but the disadvantage that it produces relatively high NOx.

Thus, control unit 25, when an unacceptably high level of NOx is measured by measurement device 15, adjusts the setting of fuel split valve 23 to decrease the fraction of fuel provided to pilot fuel supply lines 19 and therefore correspondingly increase the fraction of fuel provided to main fuel supply lines 17. This has the effect of lowering NOx, but at the risk of possibly producing unstable combustion.

SUMMARY OF INVENTION

It has been found with the gas turbine engine of FIGS. 1 to 4 that, on occasion, when the fraction of fuel supplied to the pilot fuel supply lines is decreased to a level at which NOx would normally drop to an acceptable level, this is not happening, with the consequence that the control unit further decreases the fraction resulting in unstable combustion and engine failure.

According to the present invention there is provided a combustion apparatus comprising: an air inlet; a first measurement device for measuring the amount of a gas in the air inlet; at least one combustor; a plurality of fuel supply lines to the combustor(s); an exhaust; a second measurement device for measuring the amount of the gas in the exhaust; and a control unit arranged to vary the fuel supply in the plurality of fuel supply lines so as to control the amount of the gas in the exhaust, the variation being made in dependence upon both the measured amount of the gas in the air inlet and the measured amount of the gas in the exhaust.

BRIEF DESCRIPTION OF THE DRAWINGS

The invention will now be described, by way of example, with reference to the accompanying drawings, in which.

DETAILED DESCRIPTION OF INVENTION

Figure 5:
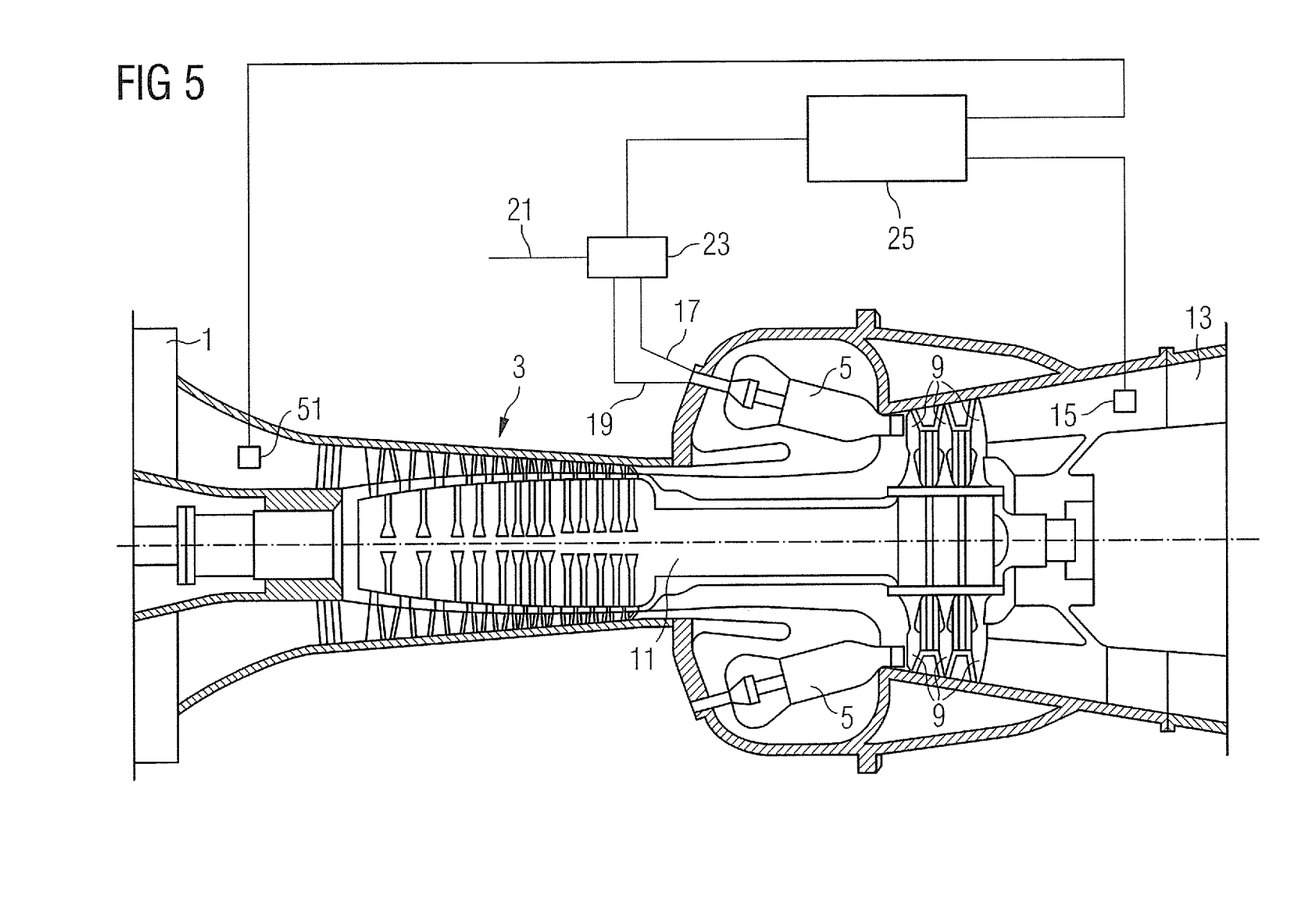
FIG. 5 is a longitudinal cross section through a gas turbine engine according to the present invention.

The gas turbine engine according to the present invention of FIG. 5 is the same as the gas turbine engine of FIGS. 1 to 4 with the exception that in the engine of FIG. 5: (i) a measurement device 51 is located in air inlet 1 for measuring the amount of NOx in the air inlet, and (ii) control unit 25, in order to control the amount of NOx in the exhaust, adjusts the setting of fuel split valve 23 based on the measured amount of NOx in the exhaust minus the measured amount of NOx in the air inlet.

It was realised that above mentioned problem of engine failure with the engine of FIGS. 1 to 4 was due to the level of NOx in the air of the environment in which the engine is operating. This background NOx will be present in the exhaust of the engine in addition to the NOx produced by the engine. If the background NOx is appreciable when compared to the amount of NOx required to be produced by the engine, then the background NOx must be taken into account in the control of the engine, since not to do so would result in too much being asked of the engine, i.e. not to do so would result in too great a reduction in the fraction of fuel supplied to pilot fuel supply lines 19, casing unstable combustion and failure of the engine. For example, if the background NOx is say 1 ppm and the amount of NOx required to be produced by the engine is say 5 ppm, then the background NOx is appreciable compared to the amount of NOx required to be produced by the engine and should be taken into account in control of the engine.

The engine of FIG. 5 focuses on the NOx actually produced by the engine by adjusting fuel split valve 23 based on the NOx actually produced by the engine which is the NOx in the exhaust minus the NOx in the air inlet (background NOx). When the NOx measured in the exhaust minus the NOx measured in the air inlet gives an unacceptably high level of NOx, to reduce this level control unit 25 adjusts the setting of fuel split valve 23 to decrease the fraction of fuel provided to pilot fuel supply lines 19 (which of course also correspondingly increases the fraction of fuel provided to main fuel supply lines 17).

Figure 6:
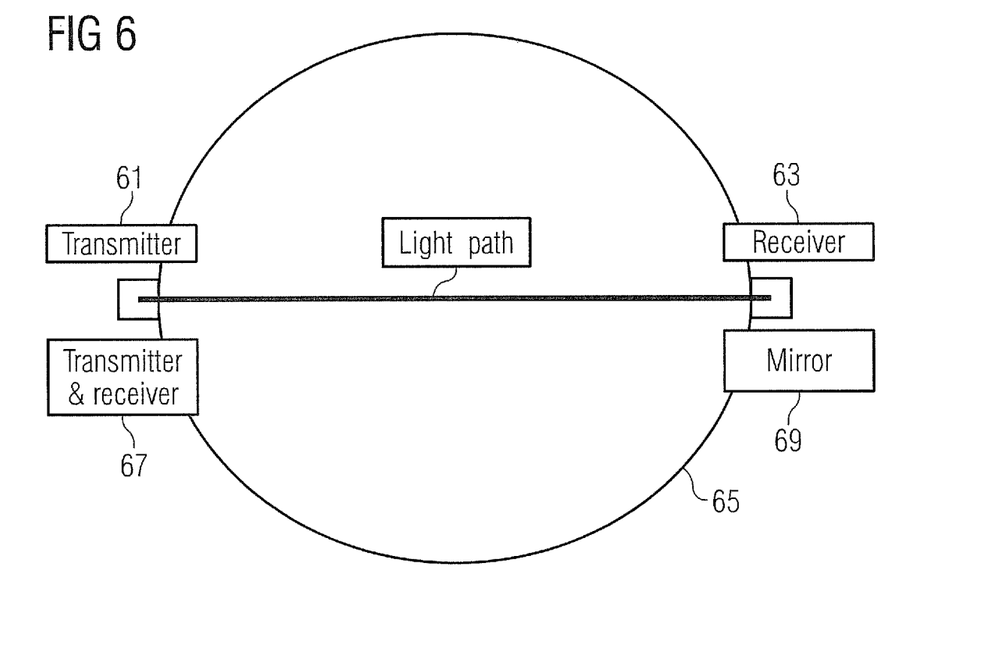
FIG. 6 illustrates schematically a first type of measurement device that can be used in the engine of FIG. 5.

Measurement devices 15, 51 of the engine of FIG. 5 can comprise the first type measurement device shown in FIG. 6. The first type measurement device comprises a cross-duct measurement device comprising either: (i) a transmitter 61 and a receiver 63 located on opposite sides of a duct 65 (exhaust duct or air inlet duct), or (ii) a transceiver 67 located on one side of duct 65 and a mirror 69 located on the opposite side of the duct.

Light is transmitted by transmitter 61 to receiver 63, or by transceiver 67 to mirror 69 and then back to transceiver 67. The gas passing along duct 65 absorbs some of the light with the consequence that there is a difference between the intensity of the light transmitted and the intensity of the light received. This difference in intensity is a measure of the amount of gas passing along the duct—the greater the difference in intensity the greater the amount of gas passing.

The range of wavelengths in the light transmitted is chosen dependent on the particular component or components in the gas to be measured. For example, in the case of NOx, infrared light could be used. The light received by receiver 63 or transceiver 67 is analysed to determine the difference in intensity between the transmitted and received light for the different wavelengths present in the light. This provides the amounts of the gas component(s) measured. This information is provided to control unit 25.

Figure 7:
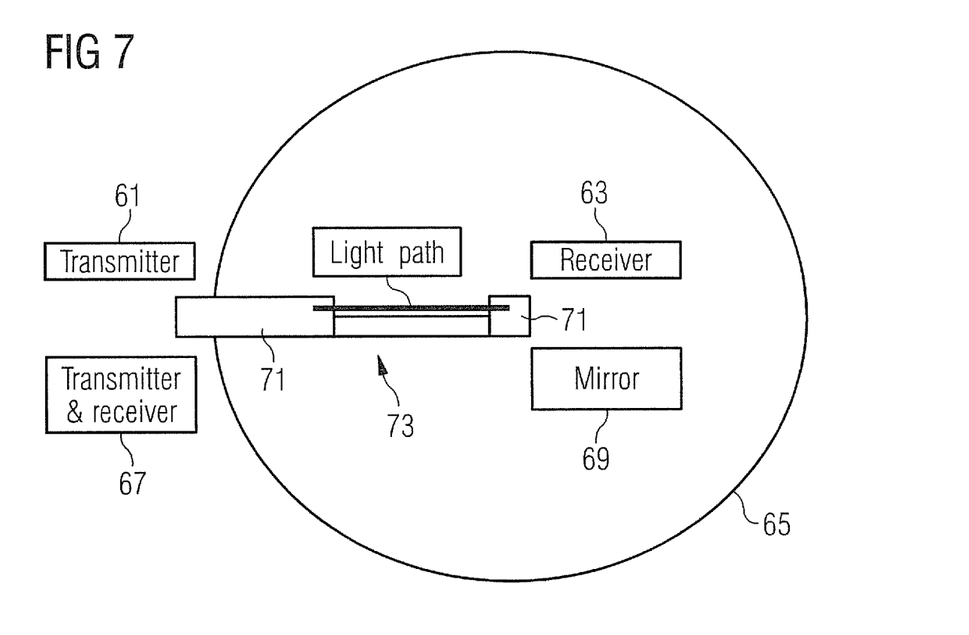
FIG. 7 illustrates schematically a second type of measurement device that can be used in the engine of FIG. 5.

Measurement devices 15, 51 of the engine of FIG. 5 can comprise the second type measurement device shown in FIG. 7. The second type measurement device comprises a probe measurement device which is the same as the cross-duct measurement device of FIG. 6 with the exception that the transmitter 61/transceiver 67 and the receiver 63/mirror 69 are located at opposite ends 71 of a probe 73 inserted in the gas path so as to traverse the path.

The probe measurement device has the advantage over the cross-duct measurement device that alignment of the transmitter and receiver or the transceiver and mirror is not required with the probe measurement device. However, the probe measurement device has the disadvantage that it measures a smaller amount of the passing gas.

Both the cross-duct and probe measurement devices measure the passing gas in situ, i.e. without extraction of a sample of the gas from within the duct to elsewhere where the sample is analysed. This is advantageous in terms of the rapidity of response of control unit 25 of the engine of FIG. 5 to a change in the level of NOx: the extraction of a sample takes time which means that adjustment of fuel split valve 23 by control unit 25 based on analysis of the sample will be delayed as compared to adjustment based on analysis where extraction was not required. Extraction also has the disadvantage that the equipment used to carry out the extraction may change the chemical make-up of the sample extracted. Further, extraction requires frequent recalibration, is maintenance intensive, and is expensive.

In the above description an increase in NOx is countered by adjustment of fuel split valve 23 to decrease the amount of fuel supplied by pilot fuel supply lines 19. This decrease is accompanied by a corresponding increase in the amount of fuel supplied by main fuel supply lines 17 so that the total amount of fuel supplied to all combustors 5, and to each individual combustor 5, remains the same. A variation on this would be to permit the total amount of fuel supplied to each individual combustor to vary whilst still ensuring that the total amount of fuel supplied to all combustors remains the same. The following paragraph is an example of this.

The pilot fuel supplied to a first half of all the combustors is reduced by reducing the total amount of fuel supplied to each combustor of this first half. The total amount of fuel supplied to each combustor of the second half of all the combustors is correspondingly increased to ensure that the total amount of fuel supplied to all combustors does not decrease. Let the total amount of fuel supplied to each combustor of the second half now be 'X'. For each combustor of the second half the division of X between the main and pilot supplies of the combustor is adjusted to reduce the pilot supply and correspondingly increase the main supply.

In the above description each combustor 5 has a main fuel supply and a pilot fuel supply. Alternatives to this are: (i) each combustor having two main fuel supplies and a pilot fuel supply, and (ii) each combustor having two main fuel supplies and no pilot fuel supply, provided in both (i) and (ii) it is possible to vary one of the supplies to the combustor to control NOx.

In the above description NOx is measured in both the air inlet and exhaust for the purpose of controlling the engine based on the measurements to control NOx. The gas controlled need not be NOx, but could for example be carbon monoxide (CO) or methane (CH4), in which case the gas concerned would be measured in both the air inlet and exhaust and the engine controlled based on these measurements to control the gas concerned. Further, a number of gases could be controlled, in which case measurements of all the gases concerned would be made in both the air inlet and exhaust and the engine controlled based on these measurements to control the gases concerned.

Figure 8:
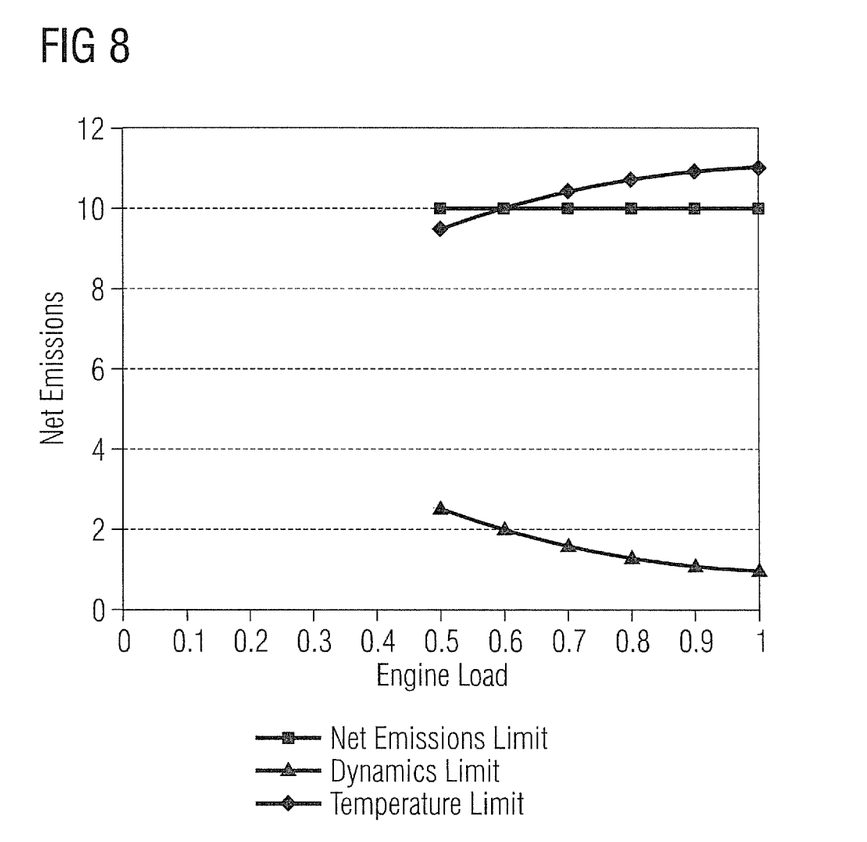
FIG. 8 is a graph of the net emissions of a gas turbine engine versus engine load, and includes three limit plots: a net emissions limit plot, a dynamics limit plot, and a temperature limit plot.

The graph of FIG. 8 relates to the control of a number of gases. FIG. 8 is a graph of the so called emissions of a gas turbine engine versus the load on the engine. The emissions comprise a number of gases: NOx, CO, CH4, etc. The values on the emissions axis of the graph are net emissions values, i.e. measurement of the emissions in the exhaust minus measurement of the emissions in the air inlet. The graph includes three limit plots: a net emissions limit plot, a dynamics limit plot, and a temperature limit plot. The net emissions limit plot comprises the net emissions it is required the engine does not exceed—as can be seen this is the same for all loads. The dynamics limit plot relates to the variation in pressure within the combustors of the engine (which is a measure of the stability of combustion within the combustors as mentioned earlier). The net emissions must not drop below the dynamics limit plot otherwise unstable combustion may result. The temperature limit plot relates to the temperature within the engine, and the net emissions must not rise above the temperature limit plot otherwise overheating within the engine may result. It can be seen that the control of the engine must be such as to keep the net emissions within the envelope defined between the dynamics limit plot and the net emissions limit plot/temperature limit plot.

In the above description fuel split valve 23 is adjusted based on measurements of gas levels in the air inlet and exhaust. Fuel split valve 23 may additionally be adjusted based on other measurements within the engine, for example engine temperature and pressure within the engine, in which case the final adjustment of fuel split valve 23 by control unit 25 would be determined based on a consideration, i.e. processing, by control unit 25 of measurements of gas levels, engine temperature, and pressure within the engine.

The adjustment by control unit 25 of fuel split valve 23 may take into account the wind speed and wind direction in the environment in which the gas turbine engine is operating.

The invention claimed is:

1. An apparatus comprising:
   a gas turbine engine comprising:
      an air inlet;
      a first measurement device that measures an amount of a gas in the air inlet;
      at least one combustor;
      a plurality of fuel supply lines to the at least one combustor;
      an exhaust;
      a second measurement device that measures an amount of the gas in the exhaust; and
      a control unit operatively coupled to the first and second measurement devices and to the plurality of fuel supply lines via one or more fuel split valves, the control unit configured to vary a quantity of the fuel supply in the plurality of fuel supply lines so as to control the amount of the gas in the exhaust, the variation of the quantity of the fuel supply being made in dependence upon both the measured amount of the gas in the air inlet and the measured amount of the gas in the exhaust.

2. The apparatus according to claim 1, wherein the first and second measurement devices comprise in situ measurement devices which measure the amount of the gas in the inlet and the exhaust respectively, in situ, without extraction from the air inlet or exhaust respectively.

3. The apparatus according to claim 2, wherein each of the in situ measurement devices transmit and receive light for the purpose of analysis of the received light to determine the amount of light absorbed by the gas, the amount of light absorbed comprising a measure of the amount of the gas.

4. The apparatus according to claim 1, wherein the plurality of fuel supply lines comprises at least one main fuel supply line and at least one pilot fuel supply line, and the variation of the quantity of the fuel supply in the plurality of fuel supply lines comprises varying the quantity of the fuel supply in at least one pilot fuel supply line.

5. The apparatus according to claim 4, wherein in the variation of the quantity of fuel supply in the plurality of fuel supply lines, the total amount of fuel supplied by the plurality of fuel supply lines remains the same.

6. The apparatus according to claim 5, wherein in the variation of the quantity of fuel supply in the plurality of fuel supply lines the total amount of fuel supplied by the plurality of fuel supply lines to the at least one combustor remains the same.

7. The apparatus according to claim 6, wherein the at least one combustor is supplied by one of the main fuel supply lines and a pilot fuel supply line, and the variation of the quantity of fuel supply in the plurality of fuel supply lines comprises varying the quantity of fuel supply in the or each combustor's pilot fuel supply line and correspondingly varying but in the opposite sense the quantity of fuel supply in the main fuel supply line of the at least one combustor.

8. The apparatus according to claim 4, wherein:
   the quantity of fuel supplied to the at least one combustor via the at least one main fuel supply line is mixed with air in the at least one combustor prior to being supplied to a region of the at least one combustor in which combustion takes place, and
   the quantity of fuel supplied to the at least one combustor via the pilot fuel supply line is not mixed with air in the at least one combustor prior to being supplied to the region of the at least one combustor in which combustion takes place.

9. The apparatus according to claim 1, wherein the variation of the quantity of fuel supply in the plurality of fuel supply lines is made in dependence upon the measured amount of the gas in the exhaust minus the measured amount of the gas in the air inlet.

10. The apparatus according to claim 1, wherein the gas is NOx.

11. The apparatus according to claim 1, wherein the variation of the fuel supply in the plurality of fuel supply lines controls the amounts of a plurality of gases in the exhaust so as to be:
   above a limit below which there would be unstable combustion within the at least one combustor; and
   below a limit above which (i) the amounts of the plurality of gases would exceed limits set thereon, and (ii) there would be overheating within the apparatus.

12. A method for operating a gas turbine engine comprising:
   measuring an amount of a gas in an air inlet of the gas turbine engine;
   measuring an amount of the gas in an exhaust of the gas turbine engine; and
   varying a quantity of fuel supply in a plurality of fuel supply lines to a combustor of the gas turbine engine by use of one or more fuel split valves, so as to control the amount of the gas in the exhaust, the variation of the quantity of the fuel supply being made in dependence upon both the measured amount of the gas in the air inlet and the measured amount of the gas in the exhaust.

13. The method according to claim 12, wherein the plurality of fuel supply lines comprises at least one main fuel supply line and at least one pilot fuel supply line, wherein said varying of the quantity fuel supply in the plurality of fuel supply lines comprises varying the quantity of fuel supply in at least one pilot fuel supply line.

\* \* \* \* \*